United States Patent [19]

Froeb et al.

[11] Patent Number: 4,479,392
[45] Date of Patent: Oct. 30, 1984

[54] FORCE TRANSDUCER

[75] Inventors: John W. Froeb, Evanston; Keith A. Engstrom, Rolling Meadows, both of Ill.

[73] Assignee: Illinois Tool Works Inc., Chicago, Ill.

[21] Appl. No.: 455,443

[22] Filed: Jan. 3, 1983

[51] Int. Cl.³ .................. H01C 10/10; G01L 5/16
[52] U.S. Cl. .................. 73/862.68; 73/862.05; 338/47; 338/96
[58] Field of Search .......... 73/862.68, 862.64, 862.05; 338/92, 93, 96, 99, 114, 47; 361/278, 280, 283, 288; 340/365 C; 200/DIG. 1

[56] References Cited

U.S. PATENT DOCUMENTS

| 1,683,059 | 9/1928 | Van Deventer | 338/96 |
|---|---|---|---|
| 3,096,656 | 7/1963 | Jackson | 73/517 R |
| 3,418,850 | 12/1968 | Goddin | 73/862.64 X |
| 3,693,059 | 9/1972 | Harris | 200/DIG. 1 |
| 3,993,939 | 11/1976 | Slavin et al. | 361/283 |
| 4,047,241 | 9/1977 | Lau et al. | 200/DIG. 1 |
| 4,055,735 | 10/1977 | Eachus | 200/DIG. 1 |
| 4,257,305 | 3/1981 | Friend et al. | 338/96 X |
| 4,417,294 | 11/1983 | Herron, Jr. | 361/288 |

FOREIGN PATENT DOCUMENTS 82335 9/1919 Switzerland .................. 338/96

Primary Examiner—Charles A. Ruehl
Attorney, Agent, or Firm—Donald D. Mondul; Thomas W. Buckman

[57] ABSTRACT

A transducer for indicating changes of an applied physical force including a first electrically propertied means connected within an electrical circuit to create an electrical potential across the first means, a second electrically propertied means adapted to be placed in contact with the first means in a manner so as to reflect a linear relationship between the area of contact between the two means and the force applied to the second means. A preferred embodiment utilizes an elastomeric actuator to apply the force to the second means.

12 Claims, 10 Drawing Figures

FORCE TRANSDUCER

BACKGROUND OF THE INVENTION

The present invention is directed to a device presenting an amount of force applied to it, conversion of that force to an output of an electrical type of energy, and transmission of that output from the device for further processing and evaluation to indicate the amount of such force present at any given particular time. The present invention is similar to the device disclosed in U.S. Patent application Ser. No. 404,266, filed Aug. 2, 1982, which application is assigned to the assignee of the present application. The present invention is designed to overcome some of the shortcomings of the invention of application no. 404,266 while retaining the advantages of simplicity, reliability, low cost of production, and durability.

SUMMARY OF THE INVENTION

The invention is a device for conversion of energy, in the form of a force applied, to an output of a different type than and proportional to the force applied. The present invention is designed to overcome some of the shortcomings of the invention disclosed in U.S. patent application No. 404,266, filed Aug. 2, 1982; specifically, in the prior device current flow was designed to occur interlayer, that is, between the two substrates of the device. A major and economically significant shortcoming of such an arrangement was that contact between the two substrates had to be maintained in order that current could flow and, further, that the area of contact between the two substrates was not repeatable absent complex and, consequently expensive mechanical balancing apparatus. The most immediately obvious result of this unpredictability of contact area between layers in the prior device was that there was no way to assure that an electronic indication (such as a dot on a cathode ray tube) would automatically self-zero upon release of force applied to the device.

The present invention, however, incorporates intralayer current flow so that current flows through the device continually and resistivity or other electrical properties of the device are changed by the device and reflected in an electrical output. The most significant consequence of this change to intralayer current flow is that removal of a physical force from the device results in automatic self-zeroing of the indicator dot on a CRT or of other electronic indicators as may be appropriate. This is made possible because the resistivity or other electrical property of the device in the at rest position is known and repeatably predictable; further, such electrical properties in the at rest position can be trimmed to be in balance in such situations as a joystick which would employ a plurality of such devices to allow electronic indication in two or more dimensions.

It is therefore an object of this invention to provide an energy conversion and transmission device which is simple in construction and provides reliability and durability in its operation.

A further object of this invention is to provide an energy conversion and transmission device which is inexpensive to construct.

Yet a further object of this invention is to provide an energy conversion and transmission device capable of a wide range of commercial applications with few, if any, variations in its construction.

Still a further object of this invention is to provide an energy conversion and transmission device capable of operating resistively, capactitively, or inductively with minimal changes in structural details.

A further object of this invention is to provide an energy conversion and transmission device which self-zeroes its electrical output upon removal of physical force applied to the device, which self-zeroing is repeatably predictable.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
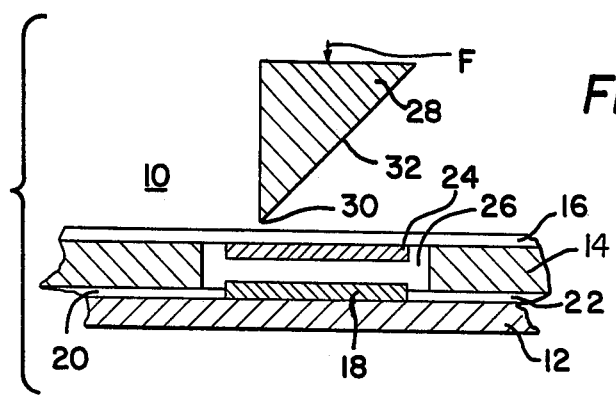
FIG. 1 is a side view of a schematic section drawing of the preferred embodiment of the present invention.
Figure 2:
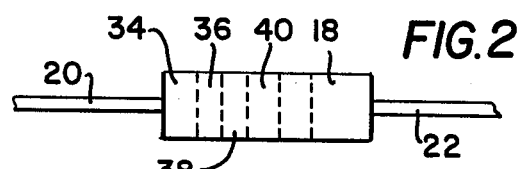
FIG. 2 is a top plan view of the resistive element of the rigid substrate of FIG. 1.
Figure 7:
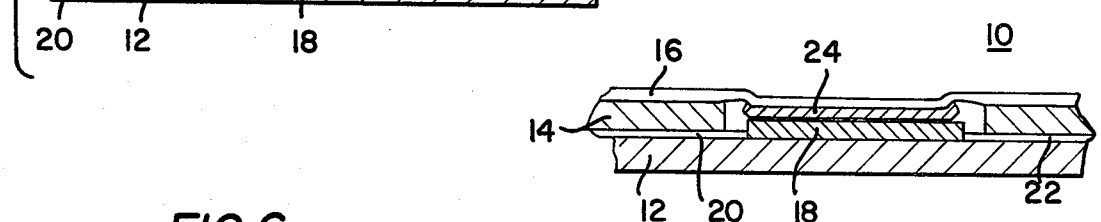
FIG. 7 is a side view of a schematic section drawing of a portion of the present invention illustrating the interaction of the elements carried on the flexible substrate and the fixed substrate in reaction to application of a force to the flexible substrate.

The preferred embodiment of a force conversion and transmission device 10 is shown schematically in section in FIG. 1. A force conversion and transmission device 10 is comprised of a nonconducting rigid substrate 12, a spacer 14 of a non-conductive material, and a non-conducting resiliently flexible substrate 16. Affixed to the rigid substrate 12 is a resistive area 18 which is electrically connected to conductor paths 20 and 22. The resistive area 18 and the conductor paths 20 and 22 are, in the preferred embodiment, comprised of an electrically propertied ink which is silkscreened on the rigid substrate 12. A similar resistive area 24 is affixed in a similar manner to the flexible substrate 16. The resistive area 18 and the resistive area 24 are in register with each other and with an aperture 26 in the spacer 14 so that electrical contact can be effected between the resistive area 18 and the resistive area 24 through the aperture 26 when a force F is applied to the flexible substrate 16 in the vicinity of the resistive area 24 urging the flexible substrate 16 carrying the resistive area 24 toward the rigid substrate 12. An actuator 28 is located in register with the aperture 26 and provides a means for application of a force F to urge the flexible substrate 16 carrying the resistive area 24 toward the rigid substrate 12 and its resistive area 18. The actuator 28 is constructed of elastomeric material in order to provide the desired interaction between the resistive areas 18 and 24 as the force F is increased, as will be discussed later. FIG. 2 illustrates in top plan view the resistive area 18 and its associated conductors 20 and 22. As the force F is increased urging the actuator 28 against the flexible substrate 16, the flexible substrate 16 moves toward the rigid substrate 12. The actuator 28, in the preferred embodiment, is wedge-shaped in cross-section as illustrated in FIG. 1 and oriented so that a corner 30 of the actuator 28 is first to engage the flexible substrate 16 upon application of sufficient force F and the sloping face 32 of the actuator 28 is progressively brought into contact with the flexible substrate 16 as the force F is increased, as will be discussed hereinafter. As the force F is increased upon the actuator 28 the corner 30 of the actuator 28 engages the flexible substrate 16 and urges the flexible substrate 16 toward the rigid substrate 12. This urging of the flexible substrate 16 toward the rigid substrate 12 will result in electrical contact being established between the resistive areas 18 and 24, the first area of such contact occurring in the vicinity of corner 30 as indicated at 34 in FIG. 2. As the force F is further increased, the elastomeric actuator 28, through its sloping face 32 rotating about the corner 30 as a fulcrum, will progressively bring further portions of resistive areas 18 and 24 into similar electrical contact as indicated at 36, 38 and 40 in FIG. 2. In the preferred embodiment, the resistive area 24 is relatively more conductive (i.e. less resistive) than resistive area 18. The consequence of such progressive electrical contact with increased application of force F as illustrated in FIG. 2 is best explained by referring to FIG. 7. In FIG. 7 the resistive area 18 is shown affixed to the rigid substrate 12 with its associated conductors 20 and 22. Further the spacer 14, the flexible substrate 16 and its associated resistive area 24 are also shown in side section schematic view. FIG. 7 illustrates the condition of the device 10 with sufficient force applied to an actuator to fully compress and to fully effect electrical connection between resistive areas 18 and 24. The current path experienced by the device 10 in such a condition would, for instance, pass through conductor 20 into conductor 18, immediately shunting to the less resistive (relatively more conductive) resistive element 24, continuing to pass through the path of least resistance in resistive area 24 force along a path as resistive area 18 and resistive area 24 remain in electrical contact, thence returning to resistive area 18 and continuing from resistive area 18 through conductor 22 to further circuit elements (not shown). Thus the effective resistance of resistive area 18 is lowered by shunting current through the electrical connection between resistive area 18 and resistive area 20 into the less resistive (relatively more conductive) path of resistive area 24 for a current path, the length of which is determined by and, therefore, proportional to the amount of force F urging the flexible substrate with its resistive area 24 into electrical contact with resistive area 18, which electrical contact is progressively increased with progressive increases of force F, as illustrated by FIG. 2.

Figure 3:
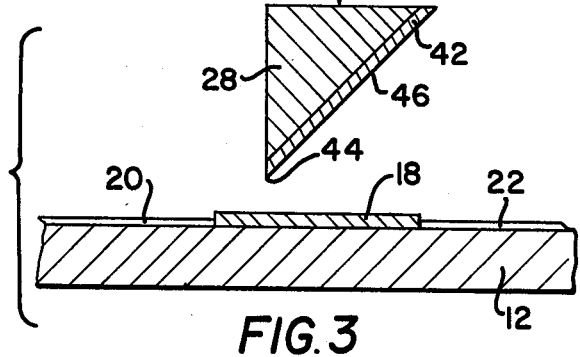
FIG. 3 is a side view of a schematic section drawing of an alternate embodiment of the present invention.

FIG. 3 illustrates an alternate embodiment to the device illustrated by FIG. 1. In FIG. 3 elements similar to those disclosed in FIG. 1 are given similar reference numbers. In FIG. 3 an elastomeric actuator 28 is urged by force F toward a rigid substrate 12 on which is affixed a resistive area 18 and its associated conductors 20 and 22. Carried upon and bonded to the actuator 28 is a conductive area 42. Of course, the entire actuator 28 could be comprised of conductive material. With increased force F the actuator 28 is urged toward the rigid substrate 12, first contacting the resistive area 18 with corner 44 of the conductive area 42. The sloping face 46 of the conductive area 42 will, with progressively increased force F, experience progressively increased electrical contact with the resistive area 18 in a manner similar to that illustrated by FIG. 2. The shunting of current and its consequential effective reduction of resistivity of resistive area 18 with this alternate embodiment will be similar to the illustration of FIG. 7 except that no flexible substrate 16, no spacer 14 and no resistive path 24 would be necessary to effective operation of the device. Current flow would occur through conductor 20 into resistive area 18 then shunting into the conductive area 42 for as long a path as conductor 42 and resistive area 18 are in electrical connection, which path is proportional in length to the amount of force F applied to the actuator 28, thence returning to the resistive area 18 and continuing from the resistive area 18 through the conductor 22 to further electronic components in the circuit (not shown).

Figure 4:
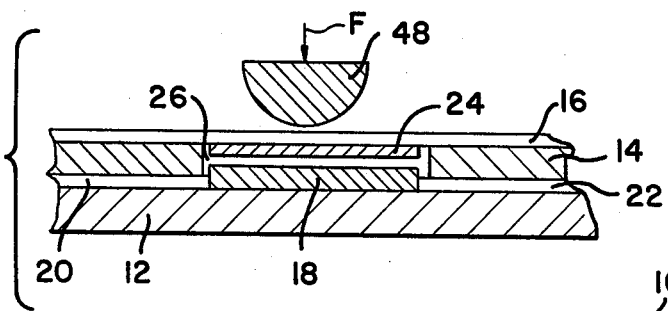
FIG. 4 is a side view of a schematic section drawing of a second alternate embodiment of the present invention.
Figure 5:
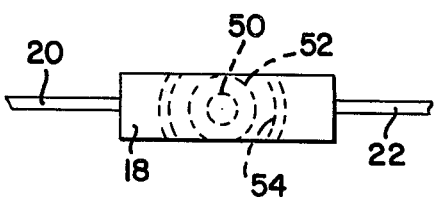
FIG. 5 is a top plan view of the resistive element on the rigid substrate of FIG. 4.

FIG. 4 illustrates yet a further alternate embodiment of the present invention, like elements to those disclosed in FIG. 1 are given like reference numbers in FIG. 4. Thus, in FIG. 4, a rigid substrate 12 has affixed thereto a resistive area 18 and its associated conductors 20 and 22. A flexible substrate 16 is maintained in spaced relation from the rigid substrate 12 by spacer 14. Affixed to the flexible substrate 16 is a resistive area 24, which resistive area 24 is relatively less resistive (i.e. more conductive) than resistive area 18. An elastomeric actuator 48 of generally hemishperic configuration is positioned in register with resistive areas 24 and 18 and an aperture 26 in spacer 14 allowing the elastomeric actuator 48 to move in response to a force F urging the actuator 48 against the flexible substrate 16, which flexible substrate 16 carrying its resistive area 24 will move in response to the force F via the actuator 48 toward the rigid substrate 12 and its resistive area 18. The physical and electrical operation of this alternate embodiment are similar to the preferred embodiment disclosed in FIGS. 1, 2 and 7 except that, as illustrated in FIG. 5, the progressively increased areas of electrical contact 50, 52 and 54 with increased application of force F to the actuator 48 are generally circular in configuration rather than generally linear in configuration as are contact areas 34, 36, 38 and 40 of FIG. 2. Electrical shunting of current and the consequent reduction of effective resistivity of resistive area 18 occur in substantially the same manner are previously discussed with respect to FIG. 7.

Figure 6:
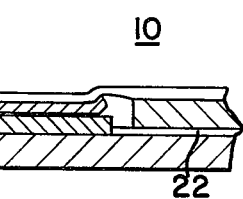
FIG. 6 is a side view of a schematic section drawing of a third alternate embodiment of the present invention.

FIG. 6 illustrates in side section view a schematic of yet another alternate embodiment of the present invention, which embodiment is analogous to that illustrated in FIG. 3. In FIG. 6 a rigid substrate 12 has affixed thereto a resistive area 18 with its associated conductors 20 and 22. An actuator 48 responsive to a force F carries thereon a conductiver layer 56. Of course the entire actuator 48 could be comprised of conductive material.

Application of force F urging the actuator 48 and its associated conductive layer 56 toward resistive area 18 will result in contact areas such as shown in FIG. 5 at 50, 52 and 54 with consequent electrical current shunting and effective reduction of resistivity of resistive area 18 as previously discussed in association with FIG. 7.

Figure 8:
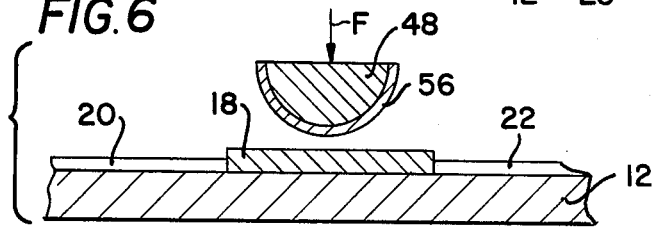
FIG. 8 is a top plan view of the present invention incorporated in a circuitboard for a joystick controller device.

FIG. 8 illustrates in top plan view a practical application of the present invention to a circuitboard for a joystick controller. Force conversion and transmission devices 58, 60, 62 and 64 are carried upon a rigid substrate 66 and connected by various conductors 68 to form a voltage divider circuit which begins and terminates at terminals 70. The mounting of an actuator carrier (not shown) in the aperture 72 in a manner whereby a plurality of actuators (not shown) is situated in register with the force conversion and transmission devices 58, 60, 62 and 64 provides a device particularly adapted for use as a joystick controller which operates to provide a signal indicative of position of the common actuator carrier in two dimensions. Such indication would be analog and would be reflective of the various progressively increasing or decreasing areas of electrical contact as the individual actuators in register with the various force conversion and transmission devices increases or decreases with movement of the common actuator carrier in various combinations of two dimensional displacements. In the most beneficial embodiment of such a joystick controller, the common actuator carrier with its associated individual actuators would be in a non-contacting orientation with respect to each of the individual force conversion and transmission devices 58, 60, 62 and 64 when in an at-rest centered condition. The various force conversion and transmission devices 58-64 could be electrically trimmed to ensure that the indicator dot on a CRT or other appropriate electrical indicator of position of the joystick would be centered or zeroed when the joystick is in its at-rest, non-contacting position. This zeroing or centering of the electrical indicator is, in this embodiment, therefore, repeatably attainable since no current must flow from the respective actuators through the respective force conversion and transmission devices 58-64 in order for this joystick controller to operate. The zero or non-contacting orientation of the joystick ensures that in that position the circuit returns to its previously trimmed zero position each and every time that the common actuator carrier returns to its physical zero position.

Z-axis indication could be accomplished with such a joystick controller by including a fifth force conversion and transmission device actuated by a concentrically operated actuator located on the common actuator carrier or in some other manner, thereby adding a third dimension to the capability of control of such a joystick controller. It is worthy of note that this third dimension capability would likewise be analog in nature.

Figure 9:
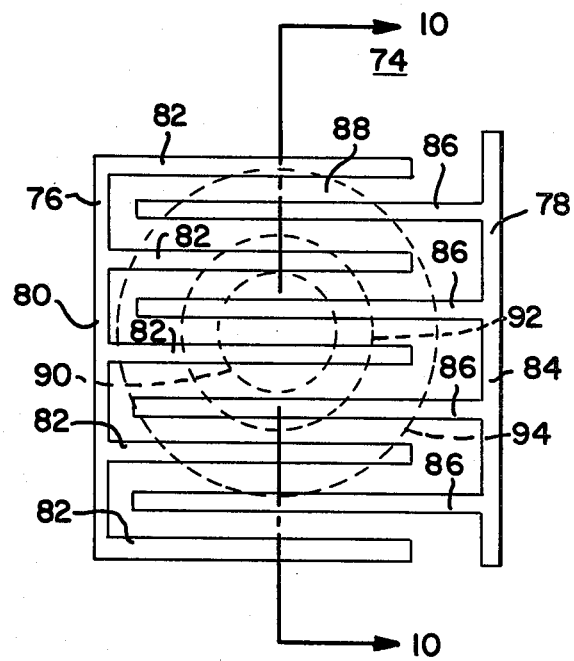
FIG. 9 is a schematic view of an interdigitated fixed capacitor as it would appear in top plan view on a printed circuitboard, with representations indicating various areas of capacitive coupling which would be made by depressing a flexible substrate downward onto the interdigitated printed capacitor.
Figure 10:
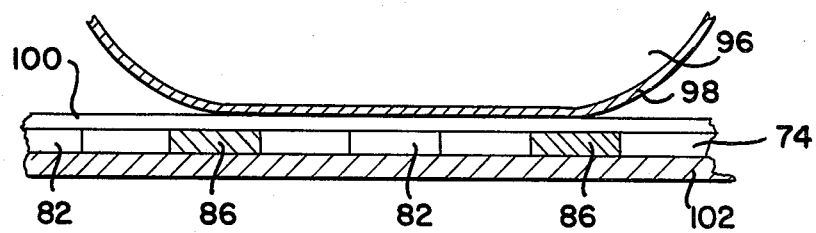
FIG. 10 is a side view of a schematic partial section taken along plane 10-10 of FIG. 9.

FIG. 9 illustrates a still further alternate embodiment of the present invention utilizing a capacitive property. In FIG. 9 as interdigitated fixed capacitor 74 is shown. The fixed capacitor 74 is comprised of two elements 76 and 78. Capacitive element 76 is comprised of a base section 80 and integral fingers 82 depending from the base 80 generally perpendicular to the base 80. The capacitive element 78 consists of a base 84 and integrally formed generally perpendicular fingers 86. The fingers 82 and 86 are oriented in alternating configuration providing therebetween gaps 88. Thus it can be seen from FIG. 9 that this interdigitated orientation of capacitive elements 76 and 78 form a fixed capacitor which can be screened, etched or in some other manner affixed to a rigid substrate such as at 102 in FIG. 10. If an actuator such as actuator 96 in FIG. 10, which actuator has a generally hemispheric shape and a conductive layer 98 affixed thereto, were to be urged toward the capacitor 74 with a dielectric overlayer 100, as shown in FIG. 10, in a manner similar to other embodiments illustrated heretofore, progressively increasing areas of capacitive coupling 90, 92 and 94 would be established between the conductive layer 98 and the capacitor 74 as increased force F urged the actuator 96 into increasingly generally parallel realtionship with the capacitor 74. These increased areas of capacitive coupling 90, 92 and 94 would result in capacitive variance of increasing pairs of the fingers 82 and 86 of the capacitor 74, thereby effectively varying the capacitance of the capacitor 74 in response to variance of the force F. Thus, the electrical property of capacitance would be varied proportionally with the force F applied to the actuator 96 in the embodiment of FIGS. 9 and 10.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims.

I claim:

1. A transducer for indicating changes of an applied physical force by changes in resistivity comprising a rigid non-conductive substrate, a resistive land affixed to said rigid substrate, conductive paths affixed to said substrate, a non-conductive spacer means having an aperture therethrough, a flexible non-conductive substrate, a conductive land affixed to said flexible substrate, and an elastomeric actuator, said conductive paths being electrically connected to said resistive land; said resistive land, said aperture, said conductive land and said actuator being substantially in register; said actuator being responsive to said force to urge said flexible substrate and its affixed said conductive land toward said resistive land through said aperture; said conductive land and said resistive land effecting an increasing area of electrical contact proportional to increases of said force, whereby resistivity of said resistive land is progressively effectively varied as said force increasingly urges said conductive land into a greater area of electrical contact with said resistive land.

2. A transducer as recited in claim 1 wherein said actuator is generally polygonal in cross-section.

3. A transducer as recited in claim 1 wherein said actuator is generally hemispheric in cross-section.

4. A transducer for indicating changes of an applied physical force by changes in an electrical property comprising a first electrically propertied means, a second electrically propertied means, a spacer means having an aperture therethrough, said spacer being intermediate said first means and said second means, and an actuator means; said first means being connected within an electrical circuit in a manner creating an electrical potential difference across said first means, said second means being in spaced substantially parallel relationship with said first means; said actuator means being responsive to said force to, in turn, urge said second means into progressively increasing area of electrical coupling with said first means through said aperture as said force increasingly, through said actuator, urges said second means toward said first means, whereby said electrical property of said first means is varied proportionally with variance of said force; said first means and said second means being resistive lands.

5. A transducer for indicating changes of an applied physical force by changes in an electrical property comprising a first electrically propertied means, a second electrically propertied means, a spacer means having an aperture therethrough, said spacer being intermediate said first means and said second means, and an actuator means; said first means being connected within an electrical circuit in a manner creating an electrical potential difference across said first means, said second means being in spaced substantially parallel relationship with said first means; said actuator means being response to said force to, in turn, urge said second means into progressively increasing area of electrical coupling with said first means through said aperture as said force increasingly, through said actuator, urges said second means toward said first means, whereby said electrical property of said first means is varied proportionally with variance of said force; said first means being a resistive land and said second means being a conductive land.

6. A transducer for indicating changes of position of a control stick in a plurality of dimensions comprising a plurality of force conversion and transmission means, a rigid actuator carrier and a plurality of elastomeric actuators; said control stick and said actuators being attached to said actuator carrier; each of said force conversion and transmission devices comprising a first electrically propertied means, a non-conducting spacer means with an aperture therethrough, and a second electrically propertied means; said first means being connected within an electrical circuit in a manner creating an electrical potential difference across said first means, said second means being in spaced substantially parallel relationship with said first means, said spacer means being positioned intermediate said first means and said second means; said first means, said second means, said aperture and a respective one of said actuators being generally in register; said actuator applying a force to said second means in response to a variance of position of said control stick, said second means being responsive to said force to progressively increasingly electrically couple with said first means whereby said electrical property of said first means is progressively increasingly effectively varied as said force increasingly urges said second means toward said first means, said plurality of force conversion and transmission devices being electrically connected to provide an electrical output signal proportinal to the multidimensional position of the control stick.

7. A transducer as recited in claim 6 wherein said first means and said second means are resistive.

8. A transducer as recited in claim 6 wherein said first means is resistive and said second means is conductive.

9. A transducer as recited in claim 6 wherein said first means is capacitive.

10. A transducer as recited in claims 6, 7, 8 or 9 wherein said actuators are generally polygonal in cross-section.

11. A transducer as recited in claims 6, 7, 8 or 9 wherein said actuators are generally hemispheric in cross-section.

12. A transducer as recited in claim 6 wherein said second means comprises an electrically propertied layer affixed to each respective one of said actuators.

* * * * *